Figure 1:
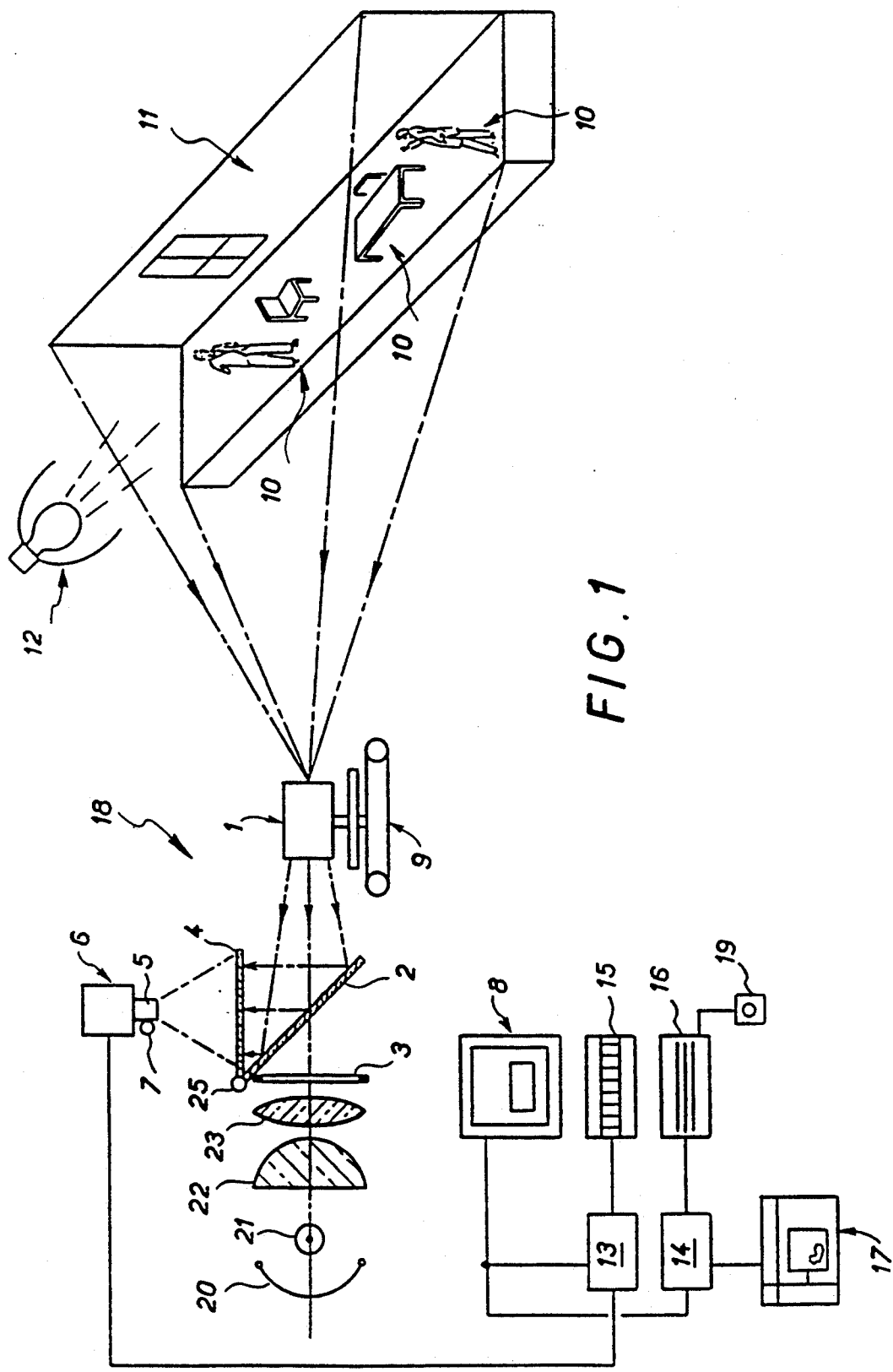

United States Patent [19]
Leclercq

[11] Patent Number: 5,331,359
[45] Date of Patent: Jul. 19, 1994

[54] METHOD FOR CREATING AND STORING A THEATRICAL DESIGN AND APPARATUS FOR IMPLEMENTING SAME

[76] Inventor: Didier Leclercq, 115 Rue du Faubourg Poissonière, 75009 Paris, France

[21] Appl. No.: 949,873

[22] PCT Filed: Jun. 18, 1991

[86] PCT No.: PCT/FR91/00482
§ 371 Date: Nov. 24, 1992
§ 102(e) Date: Nov. 24, 1992

[87] PCT Pub. No.: WO91/20050
PCT Pub. Date: Dec. 26, 1991

[30] Foreign Application Priority Data

Jun. 20, 1990 [FR] France ............................ 90 07714

[51] Int. Cl.[5] .................. G03B 21/26; G03B 29/00
[52] U.S. Cl. ........................... 353/28; 353/121; 353/62; 352/89; 354/77
[58] Field of Search ............... 353/21, 22, 28, 44, 353/62, 97, 121, 122; 354/77, 78, 76, 296; 352/89, 87, 138

[56] References Cited

U.S. PATENT DOCUMENTS

| | | | |
|---|---|---|---|
| 3,059,525 | 10/1962 | Shuftan | 352/89 |
| 3,227,509 | 1/1966 | Baker | 353/28 |
| 3,729,315 | 4/1973 | Conklin et al. | 353/121 |
| 3,898,643 | 8/1975 | Ettlinger | 340/324 A |
| 4,217,047 | 8/1980 | Jacksen et al. | 353/28 |
| 4,738,522 | 4/1988 | Lunde et al. | 353/28 |
| 4,912,751 | 3/1990 | Leclercq | 353/44 |

Primary Examiner—William A. Cuchlinski, Jr.
Assistant Examiner—William C. Dowling
Attorney, Agent, or Firm—Longacre & White

[57] ABSTRACT

The method comprises taking a negative picture of a stage and any objects, scenery, characters or other props thereon, recording and storing said negative, creating, recording and storing complementary and/or additional theatrical effects to be superimposed on the original effects resulting from the recording of the first negative, and producing carrier plates intended for projection and comprising the data corresponding to said recordings. An apparatus for implementing the method essentially comprises a first, optical assembly (18) acting both as a photographing apparatus and as a projection apparatus, a second, recording/storing apparatus (13-14), and a third, projection plate-creating assembly (17).

8 Claims, 2 Drawing Sheets

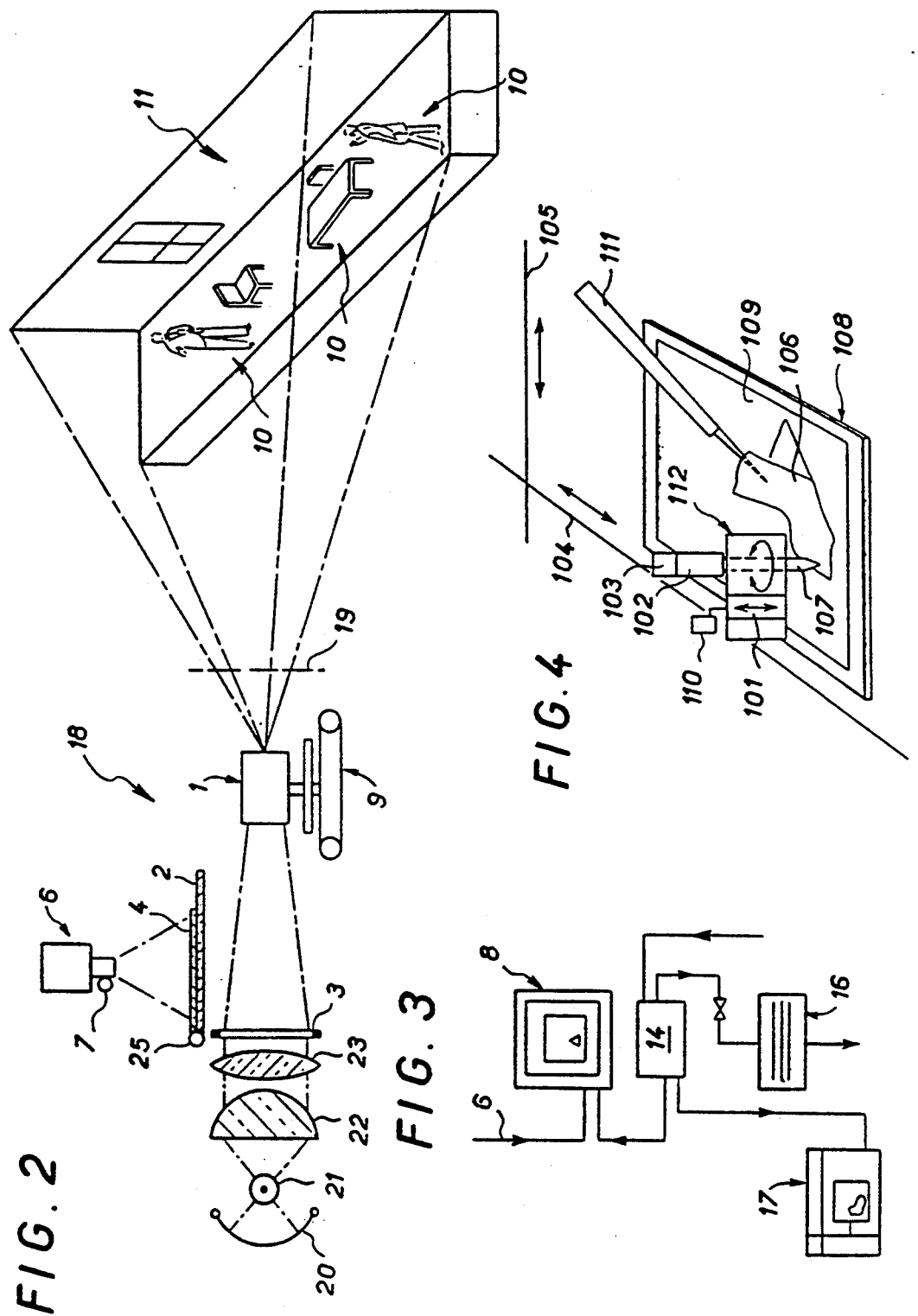

METHOD FOR CREATING AND STORING A THEATRICAL DESIGN AND APPARATUS FOR IMPLEMENTING SAME

The present invention concerns a method for creating and storing a design adapted, when placed in the light beam of a projector, to produce an illuminated area creating a decorative lighting effect on a stage, for example.

Opaque plates incorporating transparent areas allowing a light beam to pass only through these areas are usually employed. In the theatre the decorative lighting effect is obtained on the stage according to the shape and the illumination of these transparent areas which are of predefined shape.

The present invention enables the user to produce for himself plates with designs required for a show in relation to what is happening on stage.

The method for creating and storing a theatrical design adapted to produce scenic effects consists in
  forming at least one image of a stage optionally with scenery, props and persons thereon, adapted to produce first scenic effects,
  causing said image to appear on a screen,
  preparing on the screen a drawn image obtained with computer assistance producing scenic effects complementary and/or supplementary to the image of the stage,
  storing said drawn image, and
  producing support plates to project the complementary and/or supplementary scenic effects and comprising data respective to the stored drawn image.

However these drawings are obtained, their contours are transferred to the glass plate to be projected and initially covered with an opaque coating adapted to be cut away to expose areas through which the light is to pass.

According to the invention there is also provided apparatus for creating and storing a theatrical design adapted to produce scenic effects comprising:
  means for forming at least one image of a stage optionally with scenery, props and persons thereon adapted to produce first scenic effects,
  a screen for displaying the image of a stage,
  a computer-assisted drawing device adapted to prepare a drawn image for producing on the display screen scenic effects complementary and/or supplementary to the image of the stage,
  means for storing the drawn image, and
  means for producing support plates to project the complementary and/or supplementary scenic effects on the basis of data respective to the stored drawn image.
Preferably:
  the means for forming an image of a stage comprise an optical first system (18) constituting image capture apparatus,
  the storage means comprise a storage second system (13-14), and
  the plate support production means comprise a projection plate production third system (17),
  said storage system comprising at least one video screen (8) and at least one computer (13-14) associated with the computer-assisted drawing device.
Advantageously:
  the optical system comprises a video camera and projection apparatus;
  the plate production system is of a known type comprising a station for cutting out an opaque material coating film on glass and a station for exposing the cut out areas.

The scope and the benefit of the invention will be better understood from the following description with reference to the appended drawings in which:
  FIG. 1 is a diagram of apparatus for implementing the method in accordance with the invention used to store a required scenic design;
  FIG. 2 is a diagram of a part of the apparatus shown in FIG. 1 used to project said scenic designs producing the required scenic effects;
  FIG. 3 is a diagram showing a variant connection of certain elements of FIG. 1; and
  FIG. 4 is a diagram showing the function of one unit of the plate production system.

The components of apparatus in accordance with the invention will emerge from the following description of its use to store a required scenic design.

A projector 12 illuminates a stage 11 complete with scenery and props and on which persons may be present, each of these entities being denoted by the same reference number 10.

The apparatus in accordance with the invention is adapted to form a complete image of the entire stage on a frosted glass plate 4 through the lens 1 of the first optical system. The image is focused by a known type control device 9 and by a total internal reflection mirror 2 preferably disposed at 45°, said mirror being hinged at 25 and controlled to enable use of the apparatus for projection as will be explained hereinafter.

The image formed at 4 is "read" by a video camera 6 and represents exactly what will be projected by the apparatus 18 onto the stage 11 and objects and persons 10 thereon.

This image is fed in a way that is known in itself into a first computer 13 or onto a video screen of the storage system to be stored digitally and visually on the screen 8 whilst being inventoried (again in a manner that is known in itself) using the keyboard 15.

Note that the image appearing on the screen 8 is a faithful representation of the stage 11 and objects, props and persons thereon as they would appear to an observer located at the window 3 of the projection apparatus (FIG. 2). This image is introduced into a computer 14 running conventional computer-aided drafting software with its graphical input keyboard which draws lines representing complementary or supplementary effects which may be visible on the screen. By superimposing the image from the camera 6 and the image produced by the computer-aided drafting system and transmitted by the computer 14 it is possible to preview the effect that would be achieved by projecting the image on the stage when the image is reproduced on an appropriate support and in particular a plate.

With reference to the circuit shown in FIG. 3, note that the camera 6 which has the same point of view as the projection window 3 may be connected directly to the screen 8 where its image can be superimposed on the video data supplied by the computer 14.

It will be understood that it is possible in this way to store and "inventory" all scenic designs adapted to produce required scenic effects.

When the storage phase has been carried out as described, in other words after the image of the stage 11 and its scenery and persons 10 has been transmitted to the computer 13 and stored and after the required designs have been designed and plotted by computer-aided drafting according to the stored image from the camera 6, said designs are transferred by any appropriate means known in themselves to a glass plate initially covered with an opaque, preferably plastics material coating.

The area(s) through which the light is to be allowed to pass are removed manually using an appropriate tool. All of this operation may instead be carried out by means of appropriate commercially available apparatus. This stage of the method is schematically shown at 17.

The procedure may be as shown in FIG. 4, for example. The glass plate 108 with its opaque plastics material coating 109 is mounted on a frame so that it can be brought into contact with a rotating blade 107 carried by a head 112 able to move in two directions 104-105 (X-Y coordinates) according to data supplied by the computer-aided drafting computer related to the image supplied by the camera 6. By a technique that is known in itself a motor 102 rotates the blade 107 to make a cut in the coating 109 along the contour 106, for example; the instantaneous working position is given by a position encoder 103. A solenoid 110 moves the head 112 in the direction 101 if no cut is required, possibly under the control of the position encoder. A pointed tool 111 can then be used to expose manually the area within the contour 106 through which the light is subsequently to be allowed to pass.

The apparatus in accordance with the invention is then used to project the designs obtained on said plates to obtain the required scenic effect.

Referring to FIG. 2, projection is effected as follows:

The mirror 2 is retracted by the control device 25 which pivots it upwards about its pivot axis so that it does not obstruct light emanating from the lamp 21 (located at the focus of its spherical mirror 20) and passing through the condenser 22-23 illuminating the projection window 3.

The plates obtained as described previously are inserted into said window and the designs that they comprise are thus projected onto the stage 11 on which there are scenery, props and persons 10. In this way luminous designs are projected appropriate to these props, scenery or persons.

It will be readily understood that a plurality of such apparatus disposed in front of, to the side of, above, etc the same stage can be used, each apparatus being of the type in accordance with the invention. In this case, each camera of each projector having to send its own point of view to the computer 13, the computer-aided drafting processes will be independent of each other. Similarly, a plurality of glass plates obtained in accordance with the invention could be used in each apparatus and placed in the projection windows by means of automatic and/or programmable devices of well-known types.

The invention enables a computer-aided drafting system to be used to create light drawings on a stage empty of persons, props and scenery, for example to produce a checker board design on the floor or a mural decorative effect with a perspective effect and vanishing point, the effect being more accentuated if the projection apparatus is carefully disposed and positioned relative to the stage.

Note that these lighting effects can be accentuated or softened depending on the intensity of illumination by the projector. Thus the projection apparatus could be provided with a light controller 19 (FIG. 2) operated by ancillary equipment to intensify or reduce the illumination to give supplementary effects combined with those that can be obtained using projectors with colored filters, etc.

It goes without saying that the present invention has been described by way of non-limiting example only and that any useful modification in terms of substituting equivalent means can be made thereto without departing from its scope.

The control units 7, 25, 9 and 19 are advantageously incorporated into an ancillary control console.

I claim:

1. Method for creating and storing a theatrical design adapted to produce scenic effects characterized in that it consists in
   forming at least one image of a stage optionally with scenery, props and persons thereon, adapted to produce first scenic effects,
   causing said image to appear on a screen,
   preparing on the screen a drawn image obtained with computer assistance producing scenic effects complementary and/or supplementary to the image of the stage,
   storing said drawn image and
   producing support plates to project the complementary and/or supplementary scenic effects and comprising data respective to the stored drawn image.

2. Method according to claim 1 characterized in that, after the support plates are produced, the complementary and/or supplementary scenic effects are projected onto the stage.

3. Method according to claim 1 characterized in that the contour of said drawn image is transferred to a glass plate to be projected and initially covered with an opaque coating adapted to be cut away to expose areas through which light is to be allowed to pass.

4. Apparatus for creating and storing a theatrical design adapted to produce scenic effects characterized in that it comprises:
   means for forming at least one image of a stage optionally with scenery, props and persons thereon adapted to produce first scenic effects,
   a screen for displaying the image of a stage,
   a computer-assisted drawing device adapted to prepare a drawn image for producing on the display screen scenic effects complementary and/or supplementary to the image of the stage,
   means for storing the drawn image, and
   means for producing support plates to project the complementary and/or supplementary scenic effects on the basis of data respective to the stored drawn image.

5. Apparatus according to claim 4 characterized in that:
   the means for forming an image of a stage comprise an optical first system (18) constituting image capture apparatus,
   the storage means comprise a storage second system (13-14), and
   the plate support production means comprise a projection plate production third system (17),
   said storage system comprising at least one video screen (8) and at least one computer (13-14) associated with the computer-assisted drawing device.

6. Apparatus according to claim 5 characterized in that said optical system is also used as projection apparatus.

7. Apparatus according to claim 5 characterized in that the optical system (18) comprises a video camera (6) and projection apparatus (1-3-20-21-22-23).

8. Apparatus according to claim 7 characterized in that the plate production system is of a known type comprising a station for cutting out an opaque material coating film on glass (109) and a station for exposing the cut out areas (106).

* * * * *